(12) United States Patent
Loginov

(10) Patent No.: US 6,363,405 B1
(45) Date of Patent: Mar. 26, 2002

(54) COMPUTER SYSTEM AND METHOD FOR PARALLEL COMPUTATIONS USING TABLE APPROXIMATION METHODS

(75) Inventor: Vadim E. Loginov, Moscow (RU)

(73) Assignee: Elbrus International Limited, George Town Grand Cayman (CY)

( * ) Notice: Subject to any disclaimer, the term of this patent is extended or adjusted under 35 U.S.C. 154(b) by 0 days.

(21) Appl. No.: 09/220,506

(22) Filed: Dec. 24, 1998

Related U.S. Application Data

(60) Provisional application No. 60/068,738, filed on Dec. 24, 1997.

(51) Int. Cl.[7] .............................. G06F 1/02; G06F 7/38
(52) U.S. Cl. ....................................... 708/270; 708/605
(58) Field of Search .......................... 708/270, 274–277, 708/440, 605

(56) References Cited

U.S. PATENT DOCUMENTS

| | | | |
|---|---|---|---|
| 5,224,064 A | 6/1993 | Henry | |
| 5,235,535 A | 8/1993 | Nakayama | |
| 5,331,582 A | * 7/1994 | Sudo et al. | 708/277 |
| 5,604,691 A | 2/1997 | Dworkin | |
| 5,963,460 A | 10/1999 | Rarick | |

* cited by examiner

*Primary Examiner*—Tan V. Mai
(74) *Attorney, Agent, or Firm*—Townsend and Townsend and Crew LLP

(57) ABSTRACT

A method optimizes function evaluations performed by of a VLIW processor through enhanced parallelism by evaluating the function by table approximation using decomposition into a Taylor series.

2 Claims, 2 Drawing Sheets

COMPUTER SYSTEM AND METHOD FOR PARALLEL COMPUTATIONS USING TABLE APPROXIMATION METHODS

This application claims benefit of Provisional Appln. No. 60/068,738 filed Dec. 24, 1997.

FIELD OF THE INVENTION

The present invention relates to processors and computing devices and more particularly to compilers for optimized multiple function arithmetic execution units in a processor.

BACKGROUND OF THE INVENTION

Many practical applications require processing of very large amounts of information in a short period of time. Examples include weather forecasting, the design and modeling of complex dynamic systems and others, which applications frequently involve repeated estimation of modeling functions over a set of input parameters.

One of the basic approaches to minimizing the time to perform such computations is to apply some sort of parallelism, so that tasks which are logically independent can be performed in parallel. This can be done, for example, by executing two or more instructions per machine cycle, i.e., by means of instruction-level parallelism. Thus, in a class of computers using superscalar processing, hardware is used to detect independent instructions and execute them in parallel, often using techniques developed in the early supercomputers.

Another more powerful approach to exploiting instruction level parallelism is used by the Very Long Instruction Word (VLIW) processor architectures in which the compiler performs most instruction scheduling and parallel dispatching at compile time, reducing the operating burden at run time. By moving the scheduling tasks to the compiler, a VLIW processor avoids both the operating latency problems and the large and complex circuitry associated with on-chip instruction scheduling logic.

As known, each VLIW instruction includes multiple independent operations for execution by the processor in a single cycle. A VLIW compiler processes these instructions according to precise conformance to the structure of the processor, including the number and type of the execution units, as well as execution unit timing and latencies. The compiler groups the operations into a wide instruction for execution in one cycle. At run time, the wide instruction is applied to the various execution units with little decoding. The execution units in a VLIW processor typically include arithmetic units such as floating point arithmetic units. An example of a VLIW processor that includes floating point execution units is described by R. K. Montoye, et al. in "Design of the IBM RISC System/6000 floating point execution unit", IBM J.Res. Develop., V. 43 No.1, pp. 61–62, January 1990. Additional examples are provided in U.S. Pat. No. 5,418,975, as well as pending patent application Ser. Nos. 08/733,480, 08/733,479, 08/733,833, 08/733, 834, 08/733,831 and 08,733,832, the content of which is incorporated herein for all purposes.

While these processors are capable of performing a variety of tasks adequately, it is perceived that the performance of VLIW processors can be improved further by optimizing them with respect to certain specialized but highly repetitive and often used in practice tasks, such as function evaluation using decomposition into Taylor series.

SUMMARY OF THE INVENTION

A novel method and system is presented for use with a VLIW processor to optimize it for use in function evaluation. In accordance with a preferred embodiment of the present invention, a novel approach is presented to enhancing parallelism in the evaluation of functions by table approximation methods using decompositions into Taylor series.

DETAILED DESCRIPTION OF THE INVENTION

Figure 1:
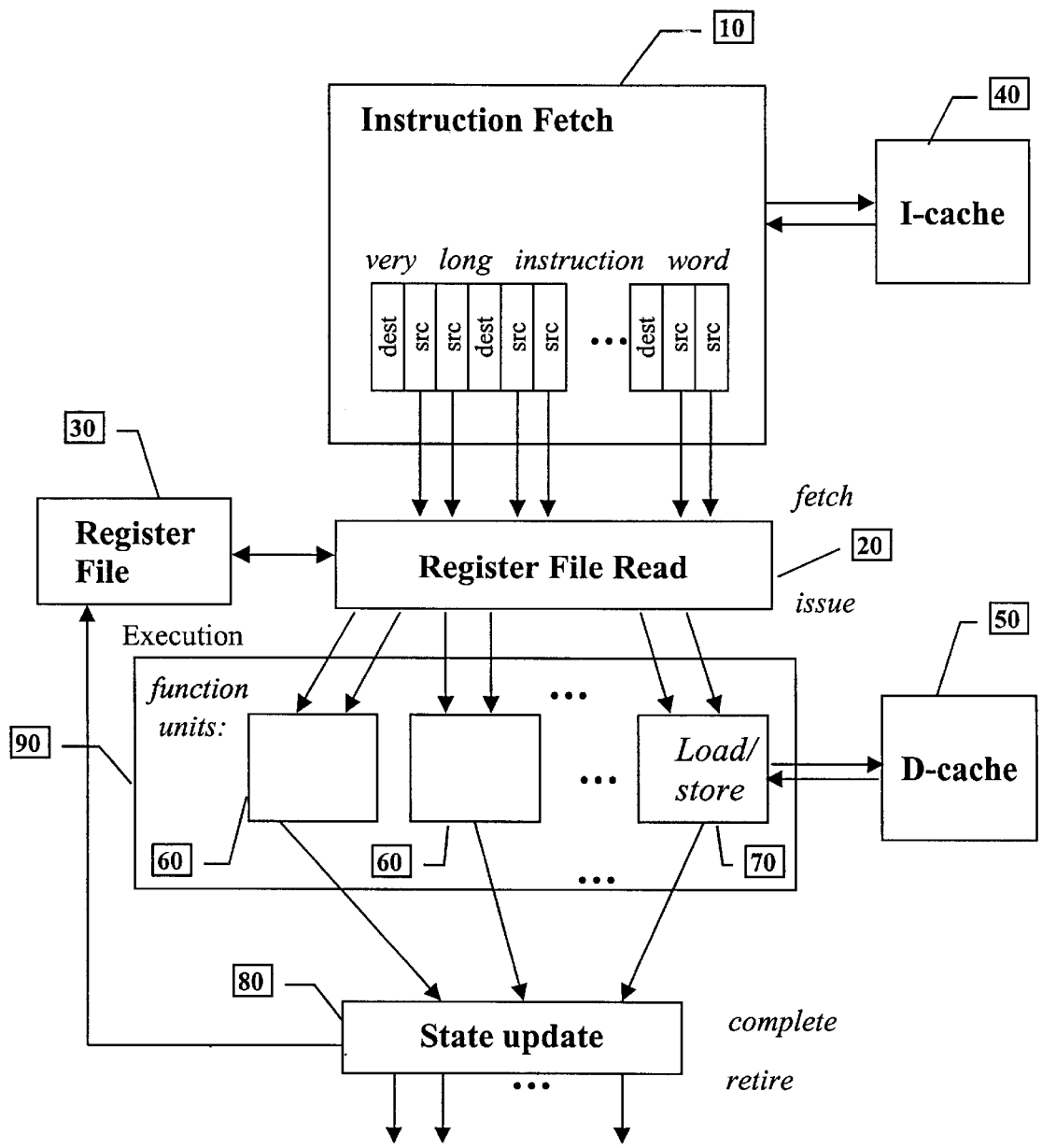
FIG. 1 illustrates in block diagram form the architecture of a VLIW processor that can be used in a preferred embodiment of the present invention.

FIG. 1 illustrates in block diagram form the architecture of a VLIW processor that can be used in a specific embodiment of the present invention. The processor generally comprises and instruction fetch unit 10; execution unit 90; register file 30, the content of which is read in file read unit 20; instruction cache 40 and data cache 50; and state update unit 80.

Generally, instruction fetch unit 10 acquires active instructions via the I-cache 40. Execution unit 90 comprises a set function units 60. Example function units are integer arithmetic logic units (ALU), floating point addition and multiplication. also included are data access operation units 70. Units may be pipelined into stages. Once instructions are completed, their result is written in the state update unit 80 that writes back results in the register file 30.

The general architecture of a VLIW processor will not be discussed in further detail. Interested readers are directed to U.S. Pat. No. 5,418,975, and pending patent application Ser. Nos. 08/733,480, 08/733,479, 08/733,833, 08/733,834, 08/733,831 and 08,733,832, the disclosures of which are incorporated by reference herein. As known in the art, in a VLIW architecture, the very long instructions words present the scripts for the function units to follow at execution time. The level of parallelism desired in a particular application is achieved using local and global scheduling that enables optimum distribution of the workload among different functional units.

In accordance with a preferred embodiment of the present invention overall improvement in processing speed in the evaluation of certain functions is achieved by representing each function as a series expansion around one or more function argument values, preferably stored in a table, and providing a fast parallel method of computing the expansion series for the dx deviation from the stored value of the argument.

More specifically, in accordance with the present invention, parallel algorithms are provided for the fast computation of functions, such as sqrt(x), cbrt(x) and ln(x) by table approximation methods using decomposition into Taylor series. The method of the present invention is illustrated next in the example of fast parallel sqrt(x) function computation.

Figure 2:
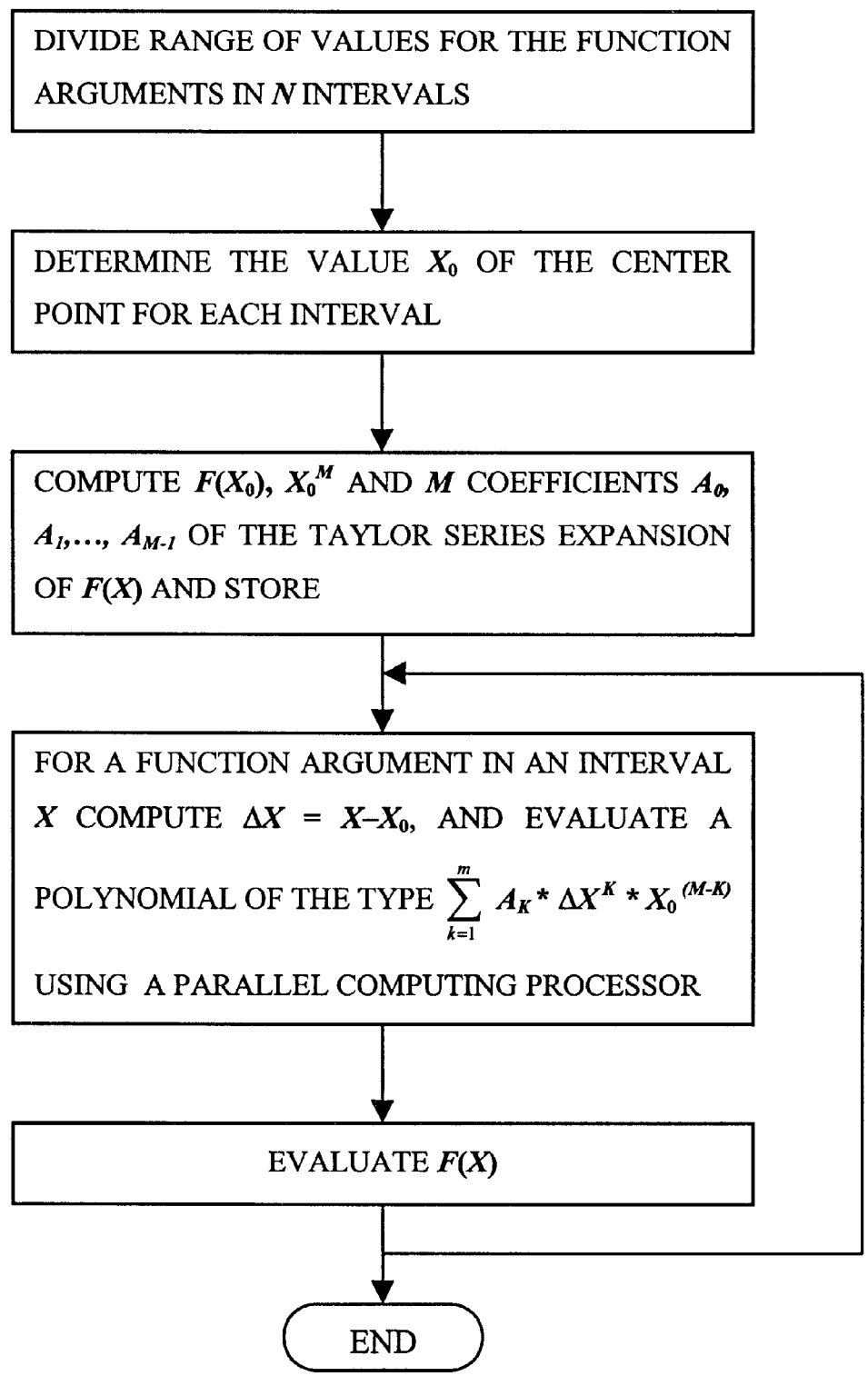
FIG. 2 illustrates the steps in accordance with a preferred embodiment of the method of the present invention.

With reference to FIG. 2, the first step of the method in a preferred embodiment is to divide the range of argument values for the approximation into n intervals. In many practical applications this range can be assumed as $0.5 < x < 1$.

Next, for each of the n intervals, the value of the function at the center $x_0$ of the range is determined. For notational simplicity, the index "i" of the interval is omitted. Thus, in a preferred embodiment of the present invention, at run time all function arguments falling within an the i-th interval is evaluated as an approximation of the function using series expansion about the center $x_0$ of the interval. The deviation of the actual function argument from the $x_0$ value is denoted dx.

Next, to compute, for example, the sqrt(x) function, in accordance with the present invention the following expression is used:

$$\text{sqrt}(x) = \text{sqrt}(x0) + \text{sqrt}(x0)/x0\hat{\ }m * (a0*dx*x0\hat{\ }(m-1) + a1*dx\hat{\ }2*x0\hat{\ }(m-2) + \ldots + a(m-2)*dx\hat{\ }(-1)*x0 + a(m-1)*dx\hat{\ }m); \quad \text{(Eqn. 1)}$$

The values of sqrt(x0) and sqrt(x0)/x0^m are computed and stored in a table. The coefficients a0, a1, ... , a(m−1) are obtained from the function decomposition into Taylor series are similarly stored in memory.

The remaining part of Eqn. 1 is a polynomial of the form $$\sum_{k=1}^{m} a(k) * dx^k * x_O^{(m-k)}$$

which can be computed conveniently with the use of different parallel computation schemes, as known in the art.

The following example illustrates a parallel computation scheme for the cbrt function:

$$x_0^4 * \left( x_0^2 * \left( \frac{a(2)}{a(1)} * dx - x_0 \right) + dx^2 * (a(4)*dx - a(3)x_0) \right) + a(5)*dx*dx^4 * ($$

where the total number of required arithmetic operations K=29, and the length of the critical path for the computation of the function evaluation is T=max(5mul+2add, 4mul+4add).

It can be appreciated, that formulae similar to Eqns. 1 and 2 can easily be derived for a number of additional functions, such as the cubic root cbrt, and the ln functions. These functions lend themselves to straightforward expansion in a Taylor series. Once the expansion is available, the values of the function at the $x_0$ point and the powers of $x_0$, as required in the expansion can be obtained and stored. The remaining part of the series expansion lends itself parallel computing that greatly reduce the time required for the function evaluation.

In accordance with a preferred embodiment of the present invention, the number of intervals n into which the range of function arguments is divided is determined by constraints on the size of the utilized tables of constants and the required accuracy. The constant m is found in a preferred embodiment on the basis of the size of the intervals, i.e., n, and requirements to the computations accuracy. The accuracy of the computation can be determined using the expressions for the error in Taylor series expansions.

Finally, in accordance with a preferred embodiment, reduction of the argument to the required approximation range and obtaining of the final result after the computations in the interval are performed in traditional way.

Although the present invention has been described in connection with the preferred embodiments, it is not intended to be limited to the specific form set forth herein, but on the contrary, it is intended to cover such modifications, alternatives, and equivalents as can be reasonably included within the spirit and scope of the invention as defined by the following claims.

What is claimed is:

1. A computer method for compiling function evaluation on a parallel computing system comprising the steps of:

providing an execution unit having a plurality of function units, each function unit capable of performing one or more arithmetic-logic operations;

dividing up the range of function arguments into n values, determining the center $x_0$ for each interval;

determining the value of the function at $x_0$, the m-th power of $x_0$ and the first m coefficients a(i) of the Taylor series expansion of the function and storing said values in a memory, where m is a number selected on the basis of the desired accuracy of the computation;

for a given argument x positioned at a distance dx from $x_0$, evaluating a polynomial of the type $$\sum_{k=1}^{m} a(k) dx^k \cdot x_0^{(m-k)}$$

using the function units of said execution unit to compute summands-of said polynomial in parallel; and combining the values stored in the memory and the evaluation of said polynomial as to provide an evaluation of the function at the x argument value.

2. The method of claim 1 further comprising the steps of:

dividing up the evaluation of a polynomial into two of more independent tasks;

determining the longest independent task, defined as a critical path for the polynomial evaluation;

minimizing the processing time for the critical path by replacing multiplication operations with addition operations; and scheduling a sequence of tasks among said plurality of function units, wherein completion of all tasks results in the polynomial evaluation.

* * * * *